United States Patent
Hunter

(10) Patent No.: US 10,179,425 B2
(45) Date of Patent: Jan. 15, 2019

(54) FIBRE PREFORM FOR LAYING ON A CURVED SURFACE OF A MOULD

(71) Applicant: Vestas Wind Systems A/S, Aarhus N. (DK)

(72) Inventor: Robert Hunter, Cowes (GB)

(73) Assignee: Vestas Wind Systems A/S, Aarhus N. (DK)

( * ) Notice: Subject to any disclaimer, the term of this patent is extended or adjusted under 35 U.S.C. 154(b) by 493 days.

(21) Appl. No.: 14/783,138

(22) PCT Filed: Apr. 4, 2014

(86) PCT No.: PCT/DK2014/050082
§ 371 (c)(1),
(2) Date: Oct. 8, 2015

(87) PCT Pub. No.: WO2014/166493
PCT Pub. Date: Oct. 16, 2014

(65) Prior Publication Data
US 2016/0052173 A1    Feb. 25, 2016

(30) Foreign Application Priority Data

Apr. 8, 2013 (DK) .................................. 2013 70189

(51) Int. Cl.
*B29B 11/16* (2006.01)
*B29C 70/34* (2006.01)
(Continued)

(52) U.S. Cl.
CPC .............. *B29B 11/16* (2013.01); *B29C 70/34* (2013.01); *B29C 70/887* (2013.01);
(Continued)

(58) Field of Classification Search
CPC .... B29B 11/16; F03D 1/0675; B32B 2603/00
See application file for complete search history.

(56) References Cited

U.S. PATENT DOCUMENTS 8,157,939 B2 * 4/2012 Stiesdal .................. B29C 70/88
156/180
8,246,882 B2 * 8/2012 Tsotsis .................... B29B 11/16
156/148

(Continued)

FOREIGN PATENT DOCUMENTS

EP        0415869 A2    3/1991
EP        1925436 A1    5/2008

(Continued)

OTHER PUBLICATIONS

Danish Patent and Trademark Office, Official Action issued in Application No. PA 2013 70189 dated Nov. 15, 2013.
European Patent Office, International Search Report and Written Opinion issued in International Application No. PCT/DK2014/050082 dated Aug. 4, 2014.

*Primary Examiner* — Jason D Shanske
*Assistant Examiner* — Brian O Peters
(74) *Attorney, Agent, or Firm* — Wood Herron & Evans LLP

(57) ABSTRACT

A method for making a root section (7) of a wind turbine blade (5), the method comprising: providing a fiber preform (14) comprising the steps of: providing at least one first ply of dry reinforcing material (15); placing a stiffening strip (25) on the at least one first ply of dry reinforcing material; placing at least one second ply of dry reinforcing material on the stiffening strip to form a stack; and binding the stack together along binding rows (16); the method further comprising placing the fiber preform on a curved mold surface such that the binding rows and the stiffening strip are orientated in a chordwise direction; wherein the stiffening strip has a stiffness such that the stack is self-supporting so that the stack does not buckle when laid on the curved mold surface.

19 Claims, 7 Drawing Sheets

(51) Int. Cl.
   *F03D 1/06*   (2006.01)
   *B29C 70/88*  (2006.01)
   *B29L 31/08*      (2006.01)
   *B29K 105/08*     (2006.01)
   *B29K 309/08*     (2006.01)
   *B29C 70/54*      (2006.01)

(52) U.S. Cl.
   CPC .......... *F03D 1/0675* (2013.01); *B29C 70/543* (2013.01); *B29K 2105/0872* (2013.01); *B29K 2309/08* (2013.01); *B29L 2031/085* (2013.01); *B32B 2262/101* (2013.01); *B32B 2305/076* (2013.01); *B32B 2315/085* (2013.01); *B32B 2603/00* (2013.01); *Y02E 10/721* (2013.01); *Y02P 70/523* (2015.11)

(56) References Cited

U.S. PATENT DOCUMENTS

| | | | |
|---|---|---|---|
| 9,259,858 B2 * | 2/2016 | Gupta | D05B 23/00 |
| 2011/0318186 A1 * | 12/2011 | Kristensen | F03D 1/0658 |
| | | | 416/219 R |
| 2012/0141283 A1 * | 6/2012 | Bell | F03D 1/0675 |
| | | | 416/226 |
| 2015/0093250 A1 * | 4/2015 | Busbey | F03D 1/0675 |
| | | | 416/241 R |

FOREIGN PATENT DOCUMENTS

| | | | |
|---|---|---|---|
| EP | 2338666 | A1 | 6/2011 |
| WO | 2010083840 | A2 | 7/2010 |
| WO | 2010097657 | A1 | 9/2010 |

\* cited by examiner

FIBRE PREFORM FOR LAYING ON A CURVED SURFACE OF A MOULD

The present invention relates to a method of making a root of wind turbine blade. In particular, the present invention relates to a fibre preform for laying on the curved surface of a wind turbine blade mould.

An example horizontal axis wind turbine is illustrated in FIG. 1. The wind turbine 1 comprises a tower 2, a nacelle 3 mounted at the top of the tower and a rotor 4, coupled directly to a generator within the nacelle 3, or indirectly via a gearbox. The rotor 4 comprises at least one rotor wind turbine blade 5 coupled to a central rotor hub 6.

FIG. 2 shows the shell of a wind turbine blade 5 in a cross-sectional elevation view. The blade has a root portion 7 at which it connects to the central hub. The root section is generally circular in cross section and for blades which are 80 m or longer can be as wide as 4 or 5 meters in diameter. At the opposite end of the blade to the root 7 is the blade tip 8. The direction along the blade between the root and the blade tip is known as the spanwise direction. In the lateral direction, known as the chordwise direction, the blade extends between a leading edge 9 and a trailing edge 10.

The wind turbine rotor blade 5 of the rotor has an airfoil cross-section that, when subject to a sufficient passing air flow rate, produces lift. The lift force drives the turbine by causing a turning moment that drives the rotor 4 about the central hub 6. The rotation is then converted to electric power by the generator within the nacelle 3.

The lift force on the wind turbine blade 5 generally increases along the length of the blade in the span-wise direction from the root 7 towards the tip 8. The lift force generates an associated bending moment in the wind turbine blade.

The bending moment in the wind turbine blade 5 is greatest at the root portion 7 of the blade, where the blade 5 is proximal to and connects to the central hub 6, and there is a higher requirement for flexural strength at the root portion 7 of the blade 5 than at the tip. The root section of the blade is therefore typically designed to withstand much greater loading than other parts of the blade.

Wind turbine blades 5 are typically made out of fibre-reinforced plastics, FRP, such as carbon or glass fibres in a polymer or epoxy resin. To assemble the blade, fibre-reinforced plastic material is laid up in an appropriately shaped blade mould, with the load bearing sections such as the spars and reinforcing sections for the blade root, and cured. The mould for a single blade typically comprises two mould halves, each corresponding to one half of the blade from root 7 to tip 8 and from leading edge 9 to trailing edge 10. Each half section of the blade is separately fabricated and once completed the two halves are brought together and joined. The mould halves are then finally removed. Production of the blade is a complicated process, requiring the assembly of a number of different materials within a sizeable blade mould, within a limited period of time.

In order to reinforce the blade outer shell, a fibre with high stiffness or an increased number of layers of the FRP may be used. Using a high stiffness fibre is often a more expensive option and it is often desirable to reinforce the blade structure with an increased thickness of FRP, particularly in the root section 7. However, increasing the number of layers of FRP increases the duration of time it takes to lay each of the individual FRP sheets into a mould of the desired wind turbine blade 5 shape. Each sheet of FRP must be carefully laid into the mould ensuring that there are no formation defects, such as bends, kinks or creases, in the sheets. Any bends, kinks or creases in the sheets of FRP may lead to a concentration of stress and will therefore reduce the strength of the fibre.

Furthermore, the respective sheets of FRP are bonded together in a resin matrix and the whole operation of assembling the wind turbine blade 5 must be achieved within a given time. It would be desirable to provide a method of manufacturing the wind turbine blade 5 using a method that enables the sheets of FRP, or fibre, to be laid into the mould in a shorter period of time.

In this regard, it is known to stitch a number of fibre sheets into a stack of fibre sheets so that all of the sheets of the fibre in the stack can be laid into the mould at the same time, thus reducing the average amount of time taken to lay each individual sheet into the mould. It is an aim of the invention to provide a preform so that a number of fibre sheets (i.e. fibre plies) can be laid into a mould so that the preform conforms to the shape of the mould.

According to a first aspect of the present invention there is provided a method for making a root section of a wind turbine blade, the method comprising: providing a fibre preform comprising the steps of: providing at least one first ply of dry reinforcing material; placing a stiffening strip on the at least one first ply of dry reinforcing material; placing at least one second ply of dry reinforcing material on the stiffening strip to form a stack; binding the stack together along binding rows;

the method further comprising placing the fibre preform on a curved mould surface such that the binding rows and the stiffening strip are orientated in a chordwise direction; wherein the stiffening strip has a stiffness such that the stack is self-supporting so that the stack does not buckle when laid on the curved mould surface.

By providing the stiffening strip, the stack (and hence the preform) is self-supporting on the curved mould surface. This means that the stack will not slump under its own weight. The stiffening strip therefore has a higher stiffness than the first and second plies of dry reinforcing material. The use of the stiffening strip therefore increases the stiffness of the stack so that it will not buckle under its own weight.

Preferably, the stiffening strip comprises a cured fibre resin composite layer. The stiffening strip may comprise a cured glass fibre-resin composite mesh.

Preferably, the stiffening strip is located between binding rows.

The preform may have a chordwise direction and a spanwise direction and the stiffening strip extends in the chordwise direction of the preform. Preferably, the stiffening strip has a longer length in the chordwise direction in relation to a width in the spanwise direction.

The method may further comprise arranging a plurality of stiffening strips in the preform spaced apart along a spanwise direction.

The binding rows may be rows of stitches extending through the thickness of the preform.

Preferably, the plies of dry reinforcing material are glass fabric plies.

The method may further comprise the step of: removing the stiffening strip from the preform after the preform has been placed on the curved mould surface.

Preferably the method further comprises the steps of: infusing resin into the preform; and curing the resin.

According to a second aspect of the present invention there is provided a fibre preform for laying on a curved surface of a mould for forming part of a wind turbine blade, the preform comprising: a stack comprising a plurality of plies of dry reinforcing material and a stiffening strip; the stack being bound together along binding rows, the binding rows and the stiffening strip extending in a substantially chordwise direction of the mould, when the fibre preform is positioned in the mould; wherein the stiffening strip has a stiffness such that the stack is self-supporting so that the stack does not buckle when laid on the curved surface of the mould.

According to a third aspect of the present invention there is provided a method for making a fibre preform for laying on a curved surface of a mould for forming part of a wind turbine blade, the method comprising: providing at least one first ply of dry reinforcing material; placing a stiffening strip on the at least one first ply of dry reinforcing material; placing at least one second ply of dry reinforcing material on the stiffening strip to form a stack; binding the stack together along binding rows, the binding rows extending in a substantially chordwise direction of the mould, when the fibre preform is positioned in the mould; wherein the stiffening strip has a stiffness such that the stack is self-supporting so that the stack does not buckle when laid on the curved surface.

The present invention will now be described by way of example with reference to the accompanying drawings in which.

Throughout the following description of the preferred embodiments of the present invention, and in the drawings, the same reference numerals are used in indicate the same, or corresponding, structural features.

Figure 1:
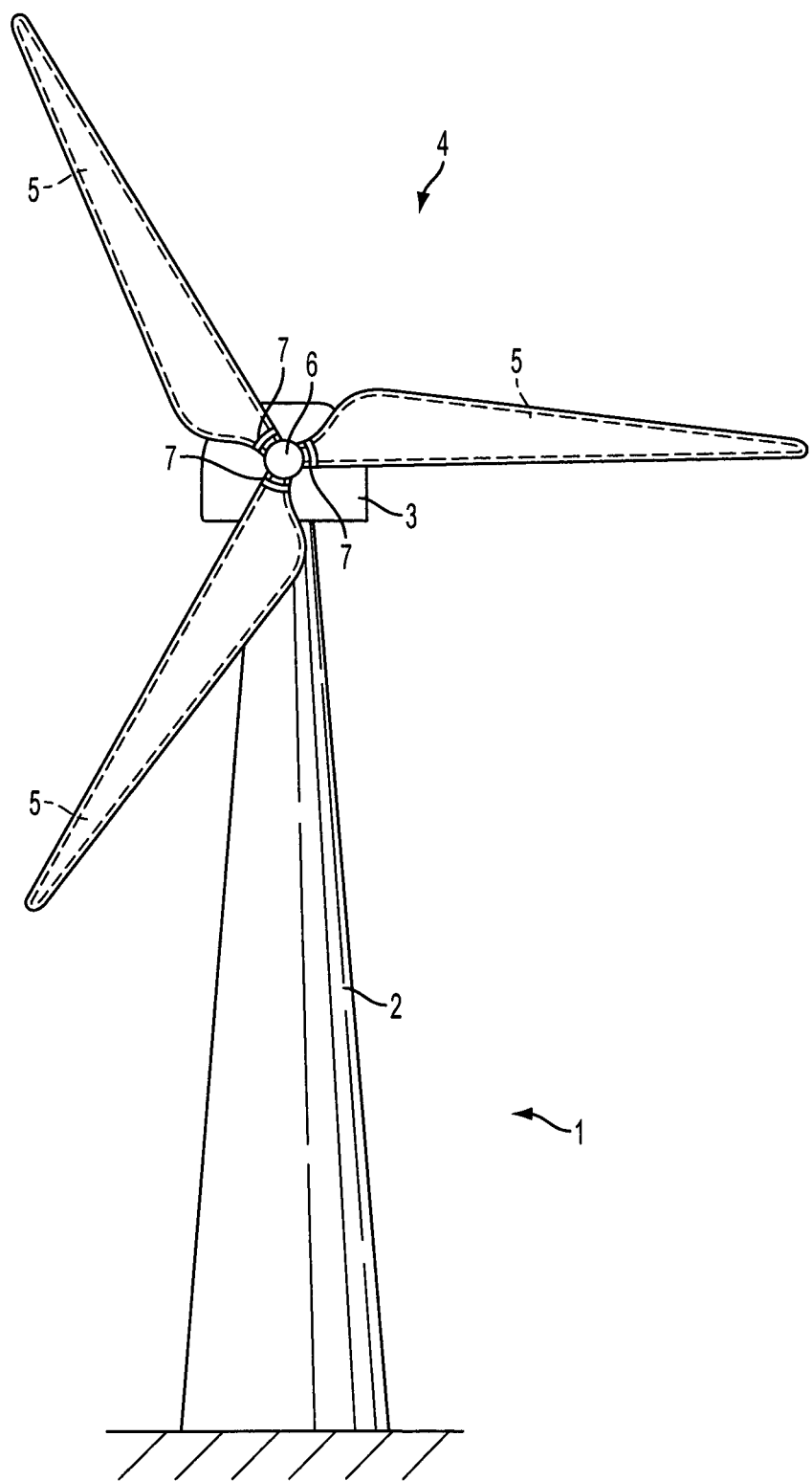
FIG. 1 is a view of a wind turbine.
Figure 2:
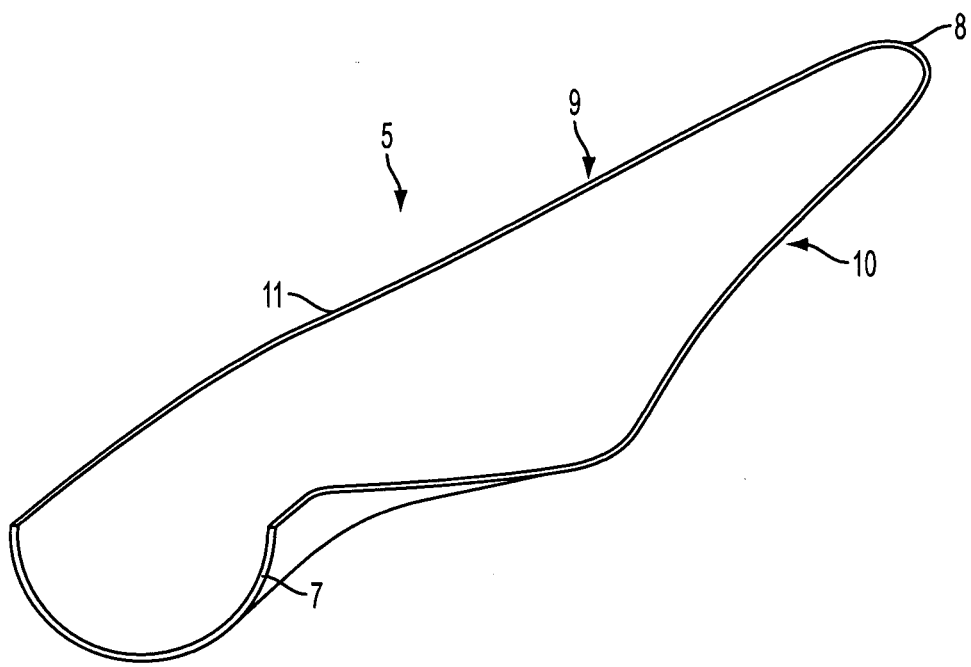
FIG. 2 is a schematic of one half shell of a wind turbine blade.
Figure 3:
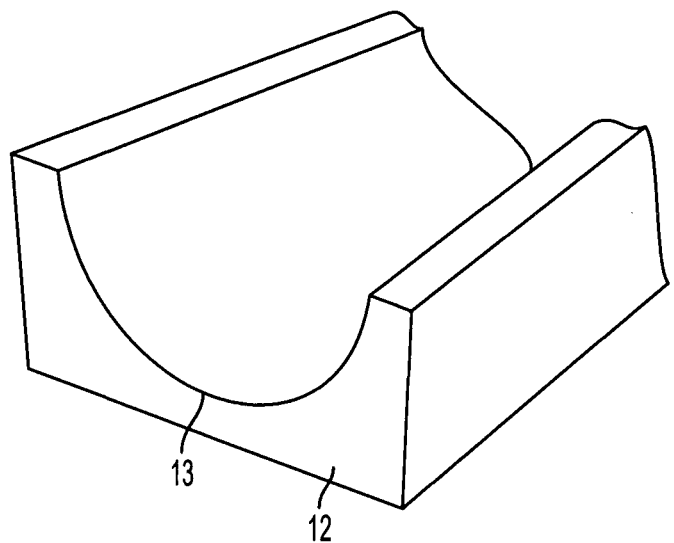
FIG. 3 shows a wind turbine blade root mould.

Referring to FIG. 2, one half shell 11 of a wind turbine blade 5 is illustrated. The half shell 8 of the wind turbine blade 5 may be formed by laying plies of reinforcing material, such as a glass fabric, into a mould (not shown) having an interior profile or mould surface that corresponds to the desired exterior blade profile. The plies of reinforcing material are then infused with resin and cured in a convention resin infusion process. A portion of a mould 12 corresponding to the desired exterior profile of the root section of one blade half shell is shown in FIG. 3. Reference number 13 indicates the mould surface.

In a preferred embodiment of the present invention, at least a part of the wind turbine blade is fabricated using preforms formed from stacks of reinforcing material that are preformed before they are laid in the mould. Forming the root section of the wind turbine blade using such preformed stacks is particularly advantageous as the number of plies of fibre required in the root is typically high in order to provide the required structural strength and load bearing ability. Removing the need to lay such plies individually by using the preformed stacks of plies means that the root section can be quickly and effectively constructed and reinforced. The preformed stacks of reinforcing material are first formed to be flat, which is useful for storage and transport and then they are subsequently placed in the mould.

Figure 4:
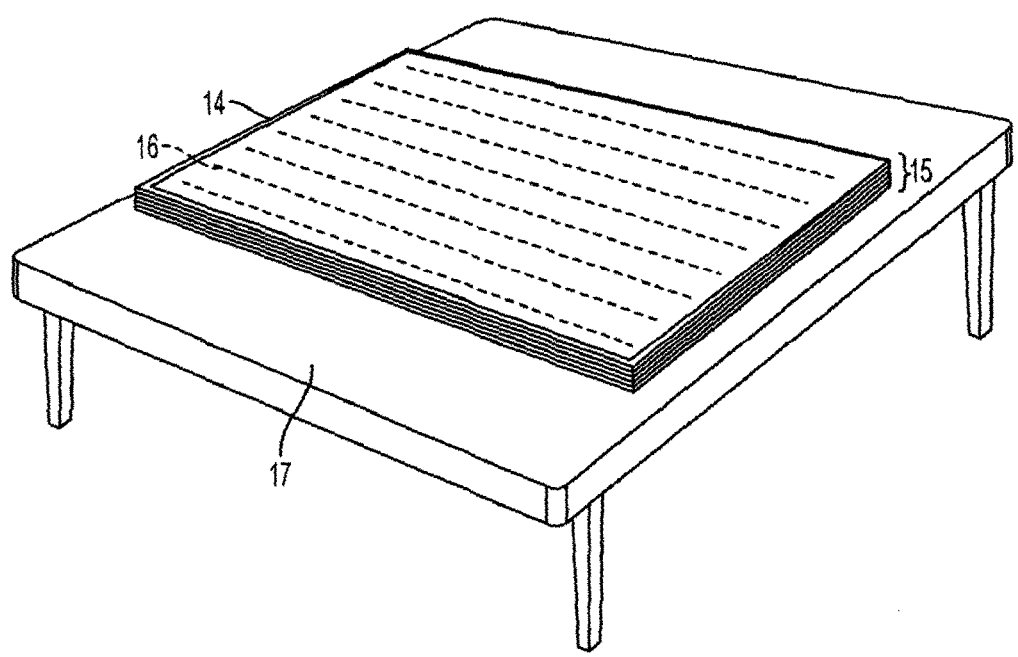
FIG. 4 shows a preform.

Turning to FIG. 4, a preform 14 is constructed by joining together a plurality of fibre plies 15 to create a stack on a table 17. The fibre plies are 'dry', that is they are not pre-impregnated with resin, but will instead be later infused with resin in a conventional resin infusion process. The plies 15 are joined by stitching them together along rows 16 so that the stitches extend through the thickness of the stack.

Figure 5:
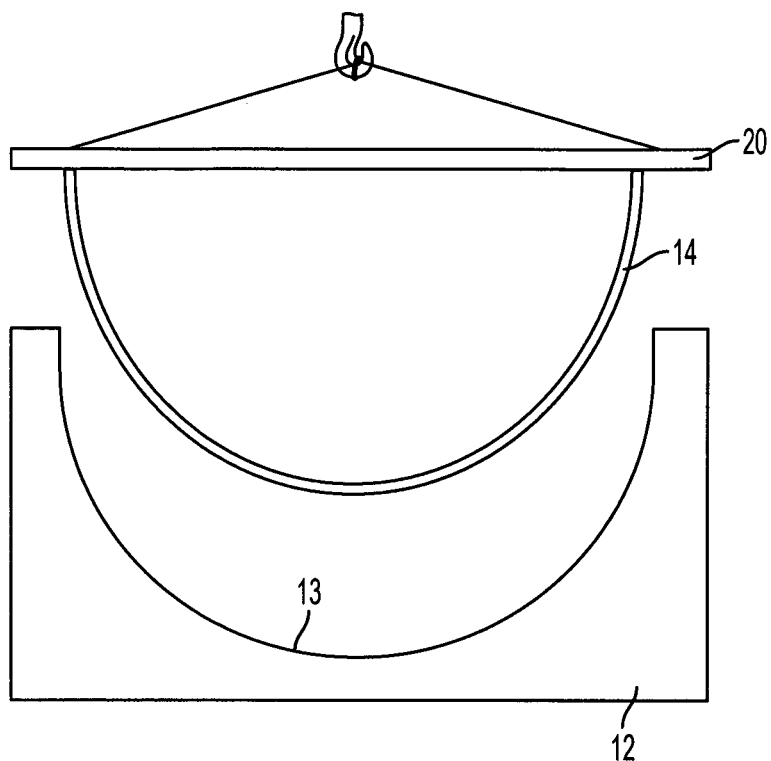
FIG. 5 shows a preform being loaded into a mould.

FIG. 5 shows how the preform 14 is placed in the mould. The preform 14 is connected to a lifting beam 20 and is suspended above the mould surface 13. When the preform 14 is at the correct position above the mould surface 13 the preform is lowered down onto the mould. Suspending the preform 14 can be achieved using any suitable lifting mechanism, such as a crane hook, guide rail or cable, for example.

Figure 6:
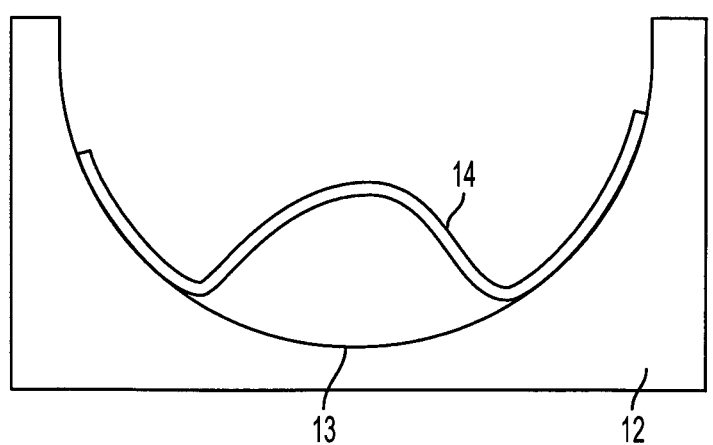
FIG. 6 shows a preform slumping in a mould.

When the preform 14 is placed in the mould 22, there is a risk that the preform 14 will slump on the mould surface 13, particularly in the area where the mould surface is almost vertical at the top of the mould. By "slump" is meant that preform 14 slides down the steep mould surface as illustrated in FIG. 6 and in effect buckles under its own weight.

Figure 7:
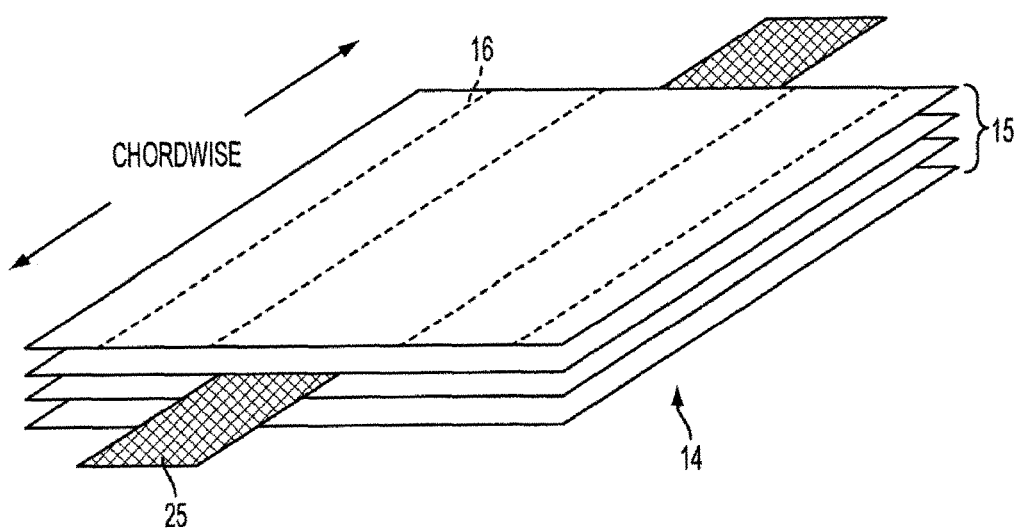
FIG. 7 shows a preform according to an embodiment of the invention.

According to the invention, to prevent this slumping of the preform an additional layer (or layers) is included in the preform such that the preform is self-supporting. FIG. 7 shows a stiffening layer 25 which has been incorporated between the plies 15 of the preform 14. The stiffening layer 25 extends in a chordwise direction. In FIG. 7, the stiffening layer 25 is shown extending beyond the edges of the plies 15, but this is just for clarity and in practice the stiffening layer is of the same chordwise width as the rest of the plies 15 in the preform. In this example, the stiffening layer is a precured mesh in the form of a grid laminate which is a cured glass-resin composite layer with an open grid structure. In another example, the stiffening layer is a cured glass-resin composite layer without a grid structure.

Figure 8:
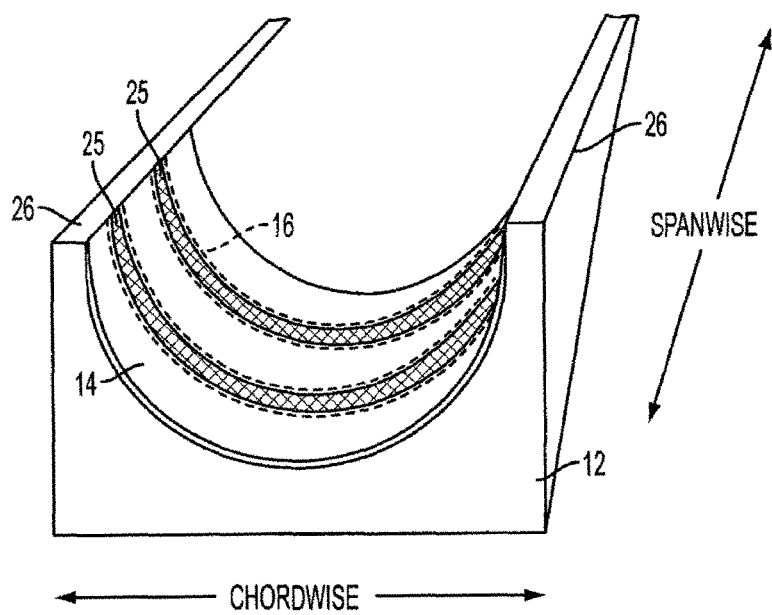
FIG. 8 shows the preform of FIG. 7 in a mould.

As best shown in FIG. 8, the stiffening layers 25 are arranged so that they extend in a chordwise direction of the mould between the leading edge and the trailing edge, and due to their stiffness, they prevent the preform 14 from slumping in the mould 12. In other words, the stiffening layer 25 acts so that the preform is self-supporting on the steep mould surface. The stiffness of the stiffening layer 25 must be such that it supports the weight of the preform 14, and so therefore the required stiffness is a function of the weight of the preform. It is within the scope of the skilled person to select a stiffening layer 25 with a suitable stiffness that acts so that it supports the preform 14, while at the same time the stiffening layer 25 must be able to bend to conform to the shape of the mould surface 13.

The use of the stiffening layers 25 prevent the preform 14 from slumping in the mould 12. This means that there is no requirement to anchor the preforms to the mould flanges 26 which can be time consuming and involves extra material cost.

It is known in the prior art to use tackified fabric to construct the preform so that the preform adheres to the mould surface 13 to prevent slumping. It is also known in the prior art to spray a tackifier onto the mould surface 13 to prevent the preform from slumping. However, both of these approaches involve health and safety risks when handling the tacky fabric or using the tackifier spray. The present invention with the stiffening layers 25 avoids these risks as the preforms 14 are safe to handle and do not require any specialised storage facilities.

In the example shown in FIG. 7, there are four plies 15 and one stiffening layer located between the middle two plies. However, there may be more plies such that the preform 14 is thicker and there can also be more stiffening layers arranged in the thickness direction.

FIG. 8 shows how one preform is arranged in the blade mould 22. The preform 14 extends from the leading edge to the trailing edge around a half circumference of the root section of the blade. This preform 14 has two stiffening layers 25 arranged in the spanwise direction of the mould 22 to provide the necessary support to prevent the preform 14 from slumping in the mould 22. In this example, the stiffening layers 25 are in the forms of strips having a narrow dimension in the spanwise direction compared to their dimension in the chordwise direction. The stitch rows 16 are also shown.

It is advantageous for the stiffening layers 25 to be in the form of strips because if they were the full spanwise length of the preform it would be difficult for the preform to conform to the shape of the mould surface because the shape of the mould is continuously changing in the spanwise direction of the mould.

In the example of FIG. 7 the stiffening layer 25 is located between the rows of stitches 16. To form the preform 14, two plies are 15 are first arranged on a stitching table, then the stiffening layer 25, and then the two upper plies. The preform stack 14 is then stitched together along the rows 16. It is desirable not to stitch through the stiffening layer because as the stiffening layer 25 is formed from a precured glass material, it may break the stitching needle if the needle passes through the precured glass mesh. As the plies 15 are stitched together along the rows 16 so that they are held tightly together, the stiffening layer 25 is actually held firmly in place between the plies 15 without the need for any stitches to pass through the stiffening layer. However, if the stitching needle is suitably strong it would be possible to stitch straight through the stiffening layer.

In an example for a preform for the root of a wind turbine blade, the stitches rows may have a pitch of 100 mm (i.e. they are separated by 100 mm). The stiffening layers 25 may have a pitch of 200 mm, so that they are formed in pockets between every other stitch row. The spanwise width of the stiffening layers may be 80 mm.

The stiffening layers 25 may be removed after the preform 14 has been placed in the mould. Here, the stiffening layer is removed just prior to the resin infusion step after all of the material for forming the blade has been laid in the mould and the risk of the preforms slumping on the mould surface is reduced. As the stiffening layers 25 have not been stitched into the preform 14 they can be slid out of the preform. This is advantageous as it reduces the weight of the finished wind turbine blade. In this circumstance, where the stiffening layer 25 is removed from the preform prior to the resin infusion, it is desirable to use a smooth stiffening layer rather than a mesh to aid the removal of the stiffening layer from the preform 14—as a smooth stiffening layer will have a lower coefficient of friction compared to a mesh. Such a smooth stiffening layer may be a precured sheet of glass reinforced plastic.

Figure 9:
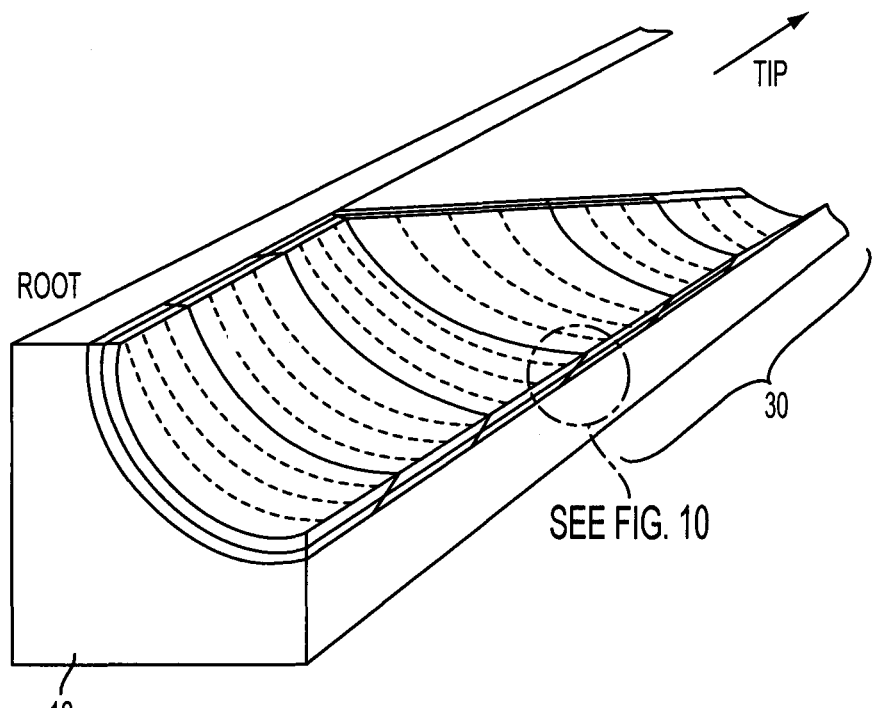
FIGS. 9 and 10 show multiple preforms in a mould.
Figure 10:
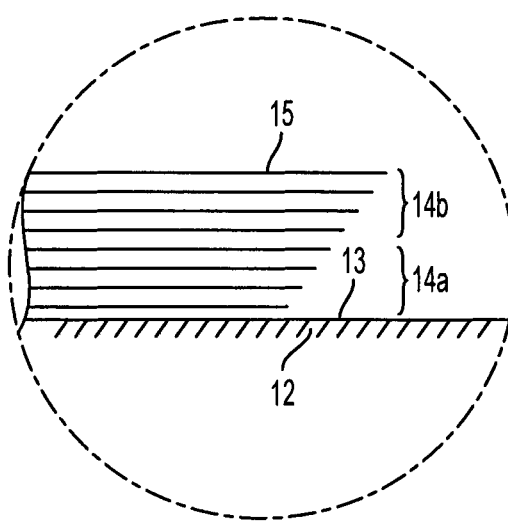

FIG. 9 shows how multiple preforms are arranged in the mould 12. For clarity, only half the mould in the chordwise direction has been shown. In this example, there are ten preforms, arranged in a double layer with an eleventh preform arranged in a single layer at the point furthest away from the root. As a wind turbine blade needs to be stiffest at the root portion which attaches to the hub, the thickness of material required decreases in the spanwise direction towards the tip and so the thickness of the preforms tapers down towards the tip. In addition, where preforms are located next to each other in the mould 12 they need to be fabricated such that there is an efficient load transfer between them in use. To this effect, as can be seen in the enlarged portion of FIG. 9 which is shown in FIG. 10, the plies 15 in the preforms are staggered to create a tapered edge to the preform. FIG. 10 illustrates a lower preform 14a and an upper preform 14b which each comprise 4 plies. Staggering the plies 15 creates a taper which results in a scarf joint when preforms are located adjacent to each other. In other words, the respective lengths of the fibre plies of the preforms are arranged to give a stepwise taper that is complementary to the stepwise taper of an adjacent preform when the two preforms are in place in the mould 12.

The preforms located in the region 30 are also tapered in the chordwise direction. This is necessary to achieve an efficient load path from the outboard part of blade to the root section of the blade. In particular, the load taken by the spar (not shown) of the blade must be distributed around the circular circumference of the root of the blade.

Figure 11:
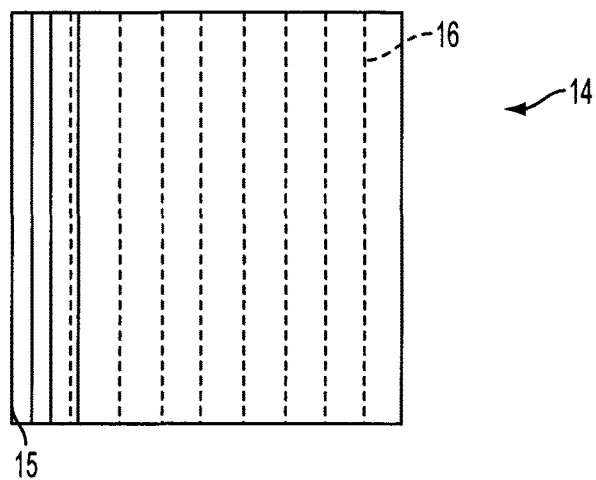
FIGS. 11, 12 and 13 show preforms with tapered edges.

FIG. 11 shows how a plan view of a preform 14 which comprises four staggered plies 15 which provides the necessary taper shown in FIG. 10. The stiffening layers 25 are not shown for clarity.

Figure 12:
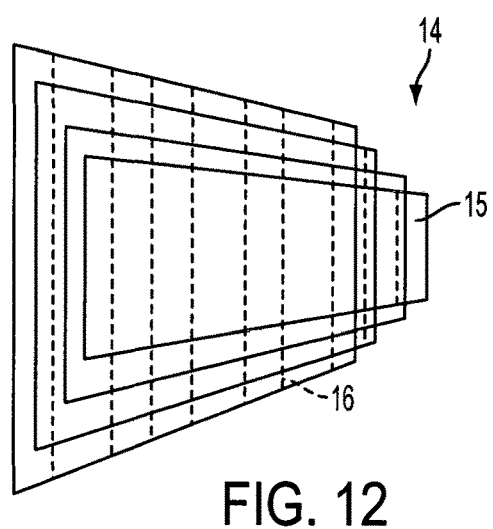

FIG. 12 shows a view of a preform 14 which can be used in the region 30. The plies 15 are staggered in both the chordwise and the spanwise directions to create the necessary tapers. Again, the stiffening layers 25 are not shown for clarity.

Figure 13:
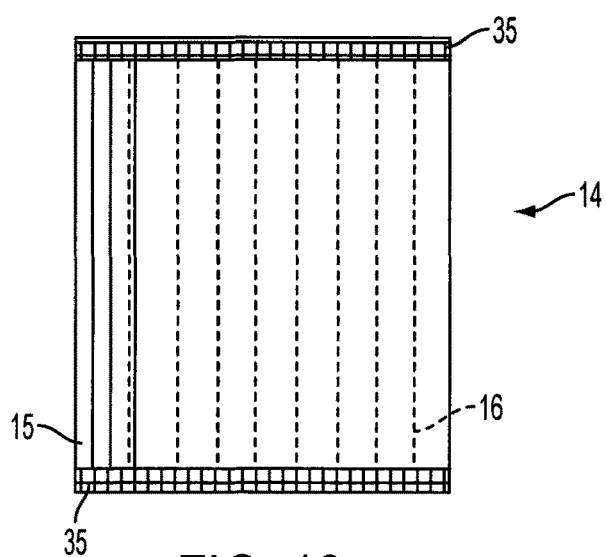

FIG. 13 shows a plan view of a preform 14 where along the spanwise edges of the preform (which will correspond to the leading and trailing edges of the blade) a tape 35 is arranged. This tape 35 is an edge scrim tape and it is folded around the edge of the preform 14 before the preform is stitched along the rows 16. The tape 35 acts to reinforce the edges and prevent fraying of the dry fibres in the plies 15. Such a scrim tape may be a 50 mm wide plasterers jointing tape.

In practice, each preform 14 preferably contains 20 fibre plies, equating to an overall thickness of approximately 1 centimeter; however, it will be appreciated that fibre stacks with other thicknesses and plies numbers could be used in other embodiments of the invention.

Each fibre ply 15 in the preform 14 may be made up of unidirectional or biaxial fibres. In an alternative embodiment, the preform is made from a plurality of unidirectional fibre plies with a different fibre axis to each adjacent fibre ply.

It will be appreciated that there are many different forms of FRP that could be used to make the wind turbine blade of the present invention; for example a glass fibre, a carbon fibre, an aramid fibre, a polyester fibre, or any combination thereof. Furthermore, alternative reinforcing materials to FRP could be used.

In alternative embodiments other methods of joining rather than stitching may be employed. For example, adhesive bonding of the plies 15 that form the preform 14 can be used, such as strips of binder adhesive which cures when it is exposed to a light source.

The invention claimed is:
1. A method for making a root section of a wind turbine blade, the method-comprising:
   providing a fibre preform comprising the steps of:
      providing at least one first ply of dry reinforcing material;
      placing a cured stiffening strip on the at least one first ply of dry reinforcing material, wherein the stiffening strip has a length and a width, and wherein the length is greater than the width;

placing at least one second ply of dry reinforcing material on the stiffening strip to form a stack; and binding the stack together along binding rows;

providing a mould having a curved mould surface, the mould defining a chordwise direction and a spanwise direction; and placing the fibre preform on the curved mould surface such that the binding rows and the length of the stiffening strip are orientated in the chordwise direction, wherein the stiffening strip has a stiffness such that the stack is self-supporting so that the stack does not buckle when laid on the curved mould surface.

2. The method according to claim 1, wherein the stiffening strip comprises a cured fibre resin composite layer.

3. The method according to claim 2, wherein the stiffening strip comprises a cured glass fibre-resin composite mesh.

4. The method according to claim 1, wherein the width of the stiffening strip is less than the width between two adjacent binding rows so that the stiffening strip is located between the two adjacent binding rows.

5. The method according to claim 1, further comprising arranging a plurality of stiffening strips in the preform spaced apart along the spanwise direction.

6. The method according to claim 1, wherein the binding rows are rows of stitches extending through the thickness of the preform.

7. The method according to claim 1, wherein the plies of dry reinforcing material are glass fabric plies.

8. The method according to claim 1, further comprising the step of:

removing the stiffening strip from the preform after the preform has been placed on the curved mould surface.

9. The method according to claim 1, further comprising the steps of:

infusing resin into the preform; and
curing the resin.

10. A fibre preform for laying on a curved surface of a mould for forming part of a wind turbine blade, the preform comprising:

a stack comprising a plurality of plies of dry reinforcing material and a cured stiffening strip, the stack being bound together along binding rows, wherein the stiffening strip has a length and a width, the length being greater than the width and the width being less than a width of the preform, wherein the binding rows and the length of the stiffening strip are oriented so as to be substantially parallel to each other, and wherein the stiffening strip has a stiffness such that the stack is self-supporting so that the stack does not buckle when laid on the curved surface of the mould.

11. The fibre preform according to claim 10, wherein the stiffening strip comprises a cured fibre resin composite layer.

12. The fibre preform according to claim 11, wherein the stiffening strip comprises a cured glass fibre-resin composite mesh.

13. The fibre preform according to claim 10, wherein the stiffening strip is located between the plies of the dry reinforcing material.

14. The fibre preform according to claim 10, wherein the width of the stiffening strip is less than the width between two adjacent binding rows so that the stiffening strip is located between the two adjacent binding rows.

15. The fibre preform according claim 10, wherein a plurality of stiffening strips are arranged in the preform spaced apart from each other.

16. The fibre preform according to claim 10, wherein the binding rows are rows of stitches extending through the thickness of the preform.

17. The fibre preform according to claim 10, wherein the plies of dry reinforcing material are glass fabric plies.

18. A wind turbine blade having a preform according to claim 10 wherein the preform is located at a root section of the blade.

19. A method for making a fibre preform for laying on a curved surface of a mould for forming part of a wind turbine blade, the method comprising:

providing at least one first ply of dry reinforcing material;

placing a cured stiffening strip on the at least one first ply of dry reinforcing material, wherein the stiffening strip has a length and a width, and wherein the length is greater than the width;

placing at least one second ply of dry reinforcing material on the stiffening strip to form a stack;

binding the stack together along binding rows, wherein the binding rows and the length of the stiffening strip are oriented so as to be substantially parallel to each other, and wherein the stiffening strip has a stiffness such that the stack is self-supporting so that the stack does not buckle when laid on the curved surface.

* * * * *